US009280675B2

(12) United States Patent
Brelot et al.

(10) Patent No.: US 9,280,675 B2
(45) Date of Patent: Mar. 8, 2016

(54) ENCRYPTING AND STORING CONFIDENTIAL DATA

(75) Inventors: Jean-Baptiste Brelot, Cambridge (GB); Cedric Denis Robert Airaud, St Laurent du Var (FR)

(73) Assignee: ARM LIMITED, Cambridge (GB)

( * ) Notice: Subject to any disclaimer, the term of this patent is extended or adjusted under 35 U.S.C. 154(b) by 950 days.

(21) Appl. No.: 13/405,497

(22) Filed: Feb. 27, 2012

(65) Prior Publication Data
US 2012/0246489 A1   Sep. 27, 2012

(30) Foreign Application Priority Data

Mar. 22, 2011   (GB) .................................. 1104803.0

(51) Int. Cl.
G06F 21/62 (2013.01)
H04L 9/00 (2006.01)
G06F 12/14 (2006.01)
G06F 9/38 (2006.01)

(52) U.S. Cl.
CPC ............ *G06F 21/6209* (2013.01); *G06F 9/384* (2013.01); *G06F 12/1408* (2013.01); *H04L 9/003* (2013.01); *H04L 2209/08* (2013.01)

(58) Field of Classification Search
CPC . G06F 21/6209; G06F 12/1408; G06F 9/384; H04L 9/003; H04L 2209/08
See application file for complete search history.

(56) References Cited

U.S. PATENT DOCUMENTS

| 2002/0156997 | A1  | 10/2002 | Farrell et al. |  |
|---|---|---|---|---|
| 2007/0028121 | A1* | 2/2007 | Hsieh | 713/193 |
| 2008/0059749 | A1* | 3/2008 | Kathuria et al. | 711/170 |
| 2008/0263305 | A1* | 10/2008 | Shu et al. | 711/170 |
| 2010/0205409 | A1* | 8/2010 | Zhu et al. | 712/217 |
| 2010/0268864 | A1* | 10/2010 | Ramiya Mothilal | 711/103 |
| 2013/0110895 | A1* | 5/2013 | Valentino et al. | 708/255 |

FOREIGN PATENT DOCUMENTS

| CN | 101901629 A | 12/2010 |
|---|---|---|
| JP | 2002-328844 | 11/2002 |
| JP | 2003-134103 | 5/2003 |
| WO | WO 02/25410 | 3/2002 |
| WO | WO 02/054228 | 7/2002 |
| WO | WO 2008/127470 | 10/2008 |
| WO | WO 2010/056531 | 5/2010 |

OTHER PUBLICATIONS

Search Report for UK 1104803.0 mailed Jul. 21, 2011.
State Intellectual Property Office of the People's Republic of China, English translation of "The First Office Action," issued in connection with Chinese Patent Application No. 201210083591.4, dated Sep. 29, 2015 (9 pages).
Japanese Office Action dated Dec. 16, 2015 issued in JP 2012-063044 and English translation, 9 pages.

* cited by examiner

*Primary Examiner* — Andrew Nalven
*Assistant Examiner* — Mary Li
(74) *Attorney, Agent, or Firm* — Nixon & Vanderhye, P.C.

(57) ABSTRACT

Data storage circuitry for securely storing confidential data and a data processing apparatus for processing and storing the data and a method are disclosed. The data storage circuitry comprises: a data store comprising a plurality of data storage locations for storing data; an input for receiving requests to access the data store; renaming circuitry for mapping architectural data storage locations specified in the access requests to physical data storage locations within the data store; encryption circuitry for encrypting data prior to storing the data in the data store, the encryption circuitry being configured to generate an encryption key in dependence upon a physical data storage location the data is to be stored in; and decryption circuitry for decrypting data read from the data store, the decryption circuitry being configured to generate a decryption key in dependence upon the physical data storage location the data is read from.

11 Claims, 4 Drawing Sheets

| Current mappings | Registers not currently mapped |
|---|---|
| $P_1 - R_0$ | $P_2, P_3, P_6$ |
| $P_4 - R_3$ | $P_{10} - P_{30}$ |
| $P_5 - R_4$ | |

FIG. 3

ENCRYPTING AND STORING CONFIDENTIAL DATA

BACKGROUND OF THE INVENTION

This application claims priority to GB Application No. 1104803.0, filed Mar. 22, 2011, the entire contents of which are incorporated herein by reference.

1. Field of the Invention

The present invention relates to the field of data processing and in particular to providing storage for data during secure data processing.

2. Description of the Prior Art

Keeping data secure and confidential during processing, such that the data and the processing of that data is not visible to the outside is a known problem in systems processing sensitive data. For example smart cards may store cryptographic keys that are used to encrypt confidential data that must not be accessible to a user. It has been found that the use of techniques such as differential power analysis or DPA of a system during its operation can provide data that may allow a person to determine information about the secure data such as the cryptographic keys stored within the system.

Various techniques have been devised to try to inhibit such attacks on the security of the system. For example, "Random Register Renaming to foil DPA" by May et al. describes how the use of randomly selected registers from a selection of available registers during register renaming can render the use of DPA to determine data stored less effective. When writing to a register for example, the amount of power used depends on the number of bits that are flipped, thus an analysis of the power signature and a knowledge of what was originally stored in the register may enable a user to determine information on the final value stored. If the register storing the value to be overwritten is randomly selected from a plurality of available registers, the value that is overwritten is not predetermined and without knowledge of this value DPA is less effective.

It would be desirable to provide increased security within a system processing confidential data.

SUMMARY OF THE INVENTION

Viewed from a first aspect, the present invention provides data storage circuitry comprising: a data store comprising a plurality of data storage locations for storing data; an input for receiving requests to access said data store; renaming circuitry for mapping architectural data storage locations specified in said access requests to physical data storage locations within said data store; encryption circuitry for encrypting data prior to storing said data in said data store, said encryption circuitry being configured to generate an encryption key in dependence upon a physical data storage location said data is to be stored in; and decryption circuitry for decrypting data read from said data store, said decryption circuitry being configured to generate a decryption key in dependence upon said physical data storage location said data is read from.

The present invention recognises that the encryption of stored data helps increase the security of a system, and that if a different key is used for each encryption then not only is the data more difficult to access, but the storage process will take differing amounts of power inhibiting any useful differential power analysis of the system. However, it also recognises that the generation and storage of a different key for each encryption is difficult to do particularly within the timing constraints of data storage.

The present invention recognises that in a system that uses renaming circuitry, then the physical data storage location, that an architectural data storage location may be mapped to, changes for each mapping. This makes information regarding the physical data storage location suitable for use as a key in encryption as it changes for each value stored and needs to be stored in any case in order to access the data value later. Thus, it will be available for decrypting the value. Thus, a system that makes use of logic already present within the system to provide and store a value that can be used to generate a key for encryption and thereby provide a more secure system is provided.

It should be noted that although the identity of the physical storage location is used to generate the key, other information may also be used in addition to this value.

Although the data store may take a number of forms in some embodiments said data store comprises a register bank and said plurality of data storage locations comprise a plurality of registers.

In many processing apparatus registers are provided as quick and easy to access data storage locations. Generally there are a number of registers present within a processing apparatus and a number of registers specified by instructions within an instruction set. In order to have compact encodings most processor instruction sets have a small set of register locations that can be directly named. Thus, generally the number of physical registers present in a register bank is greater than a number of registers that can be identified by instructions. Thus, in order to make use of all the registers present in the silicon renaming of the registers is performed during processing using register renaming circuitry.

In some embodiments, said physical data storage locations are identified by corresponding physical addresses, said encryption and decryption keys being generated from said physical addresses.

Although the data storage locations may be identified in a number of ways and this identification may be used to generate the encryption and decryption keys, in some embodiments it is a physical address that is used.

In some embodiments, said renaming circuitry is configured to determine which of said plurality of physical data storage locations are available to store data in and to perform said mapping by selecting one of said available physical data storage locations to map said architectural data storage location to according to an algorithm and to store mappings for data storage locations currently storing valid data.

The renaming circuitry may determine which physical data storage location to map an architectural data storage location to according to an algorithm. Although this is performed in a deterministic manner, the selected physical data storage location will vary depending on the available physical data storage locations that the algorithm uses. This makes the selected physical data storage location still suitable for use in generating an encryption key.

In other embodiments, said renaming circuitry is configured to determine which of said plurality of physical data storage locations are available to store data in and to perform said mapping by selecting one of said available physical data storage locations to map said architectural data storage location to according to a random or pseudo-random process and to store mappings for physical data storage locations currently storing valid data.

It may be preferable to select the physical storage location randomly or pseudo-randomly. It should be noted that selecting a value completely randomly may be difficult to do and a pseudo-random selection will generally be sufficient to provide enough noise to inhibit the differential of power analysis.

As noted in the section on the prior art, a random selection of registers for storing values inhibits differential power analysis and thus, it may further increase the security of the system if in addition to encrypting the stored data the storage location that it is stored in is selected randomly or at least pseudo-randomly.

The random or pseudo-random selection may be done by using an externally generated signal that is input to the renaming circuitry or it may be done by a random event or pseudo-random event generator within the data storage circuitry itself.

In some embodiments when selecting available physical data storage locations the available physical storage locations are physical data storage locations not currently storing valid data. In other words, they are physical data storage locations that are not currently mapped to architectural storage locations and are free to store data.

Alternatively, said available physical data storage locations are all physical data storage locations within said data store, said renaming circuitry being configured to write data stored in a currently mapped physical data storage location to another physical data storage location and to store a mapping for said another physical data storage location if said currently mapped physical storage location is selected.

In some embodiments, rather than just using physical data storage locations that are not currently storing valid data renaming circuitry may select any of the physical data storage locations to store data in. If they select a physical data storage location that is currently mapped then the data stored in that must be written to another physical data storage location and the mapping table updated to store this new mapping. In this regard the data stored is encrypted with the encryption key being generated from the physical address of the storage location. Thus, before storing it in a different location it must be decrypted and then encrypted with a key generated from the address of the new location. The physical data storage location selected is then used to store the new data value that has arrived and the mapping for this is stored. If this system is used then clearly more power is consumed than if a physical data storage location not currently storing valid data is used. However, it does mean that there is more noise introduced into the system and it is more difficult for an external person to analyse what is occurring.

In some embodiments, said renaming circuitry is configured to automatically perform remappings of currently mapped physical data storage locations.

An additional way of generating noise is for the renaming circuitry to automatically perform remapping of currently mapped physical to architectural data storage locations. The renaming circuitry may do this in response to a data access request or it may do it periodically or it may be configured to do it in dependence upon any other factor. Random remappings introduce additional power signatures and make the system even more difficult to analyse. It should be noted that decryption and re-encryption of data stored is required where the physical address and thus, the encryption key changes.

In some embodiments, said renaming circuitry is responsive to a request to update a value currently stored in said data store to: mark said physical data storage location currently storing said value to be updated as not storing valid data and delete a mapping for said physical data storage location;

map said architectural data storage location specified by said request to an available physical data storage location and to store said mapping.

If a request to update a value is received then rather than writing this value to the physical data storage location that is already mapped to this architectural register, a new mapping is performed and the previous mapping for this architectural register is deleted. Once again this makes the system difficult to analyse externally.

A second aspect of the present invention provides a data processing apparatus comprising: data storage circuitry according to a first aspect of the present invention said data store comprising a physical set of registers identified by a corresponding set of physical addresses; a processor for processing data in response to instructions from an instruction set said instructions specifying an architectural set of registers; said renaming circuitry mapping registers from said architectural set to registers within said physical set.

A third aspect of the present invention provides a method of storing data within a data store comprising a plurality of data storage locations comprising the steps of: receiving a request to access said data store; if said request is a request to store data: mapping an architectural data storage location specified in said access request to a physical data storage locations within said data store; encrypting said data prior to storing said data in said physical data storage location from said mapping using an encryption key generated in dependence upon said physical data storage location; or if said request is to read data: determining a physical data storage location corresponding to an architectural data storage location specified in said access request from a store of mappings; decrypting data read from said physical data storage location from said mapping using a decryption key generated in dependence upon said physical data storage location.

A fourth aspect of the present invention provides data storage circuitry comprising: means for storing data comprising a plurality of data storage locations; an input means for receiving requests to access said data store; renaming means for mapping architectural data storage locations specified in said access requests to physical data storage locations within said data store; encryption means for encrypting data prior to storing said data in said data store, and for generating an encryption key in dependence upon a physical data storage location said data is to be stored in; and decryption circuitry for decrypting data read from said data store and for generating a decryption key in dependence upon said physical data storage location said data is read from.

The above and other objects, features and advantages of this invention will be apparent from the following detailed description of illustrative embodiments which is to be read in connection with the accompanying drawings.

BRIEF DESCRIPTION OF THE DRAWINGS

FIG. 3 schematically shows a renaming table according to an embodiment of the present invention.

DESCRIPTION OF THE PREFERRED EMBODIMENTS

Figure 1:
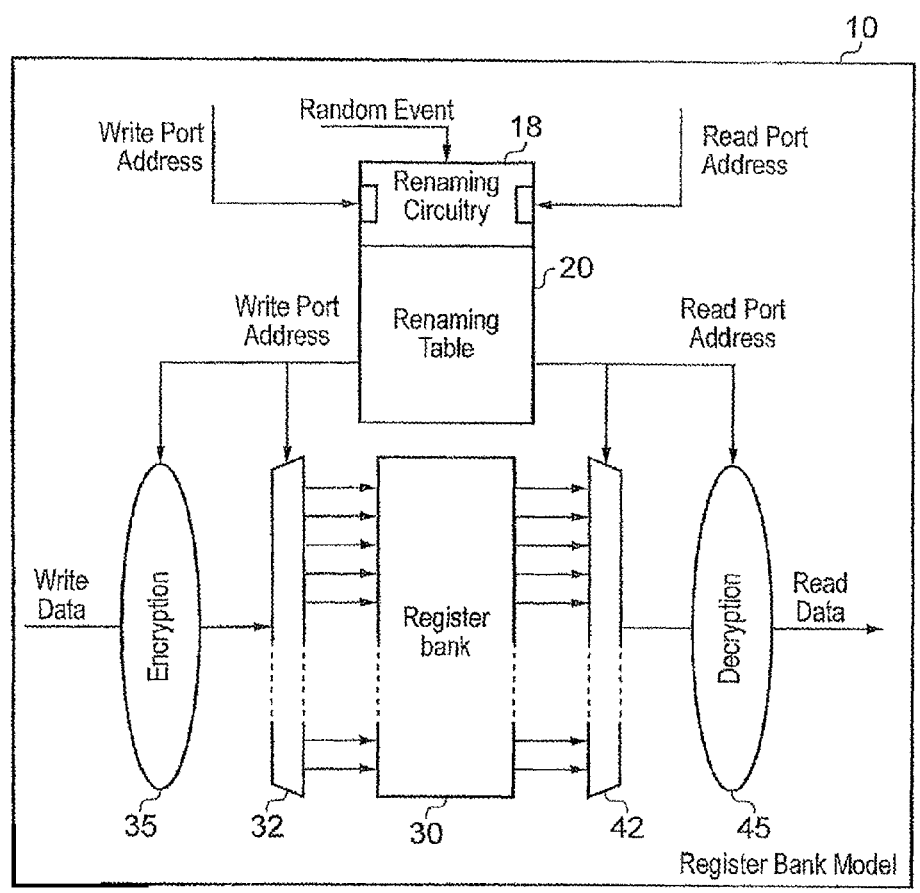
FIG. 1 shows data storage circuitry according to an embodiment of the present invention.

FIG. 1 shows data storage circuitry 10 which comprises a renaming table 20 generated by renaming circuitry 18. This renaming table stores mappings of architectural registers specified by instructions to physical registers that are present in the silicon. These mappings are generated by the renaming circuitry 18 in response to a random event that is input from an external random event generator. This random event signal is used to randomly select a register from within the register bank to map an architectural register to in response to an instruction to access that register.

Thus, in response to a write request a write address indicating an architectural register is received at the write port address input of renaming circuitry 18. This address is mapped to an address of a physical register within register bank 30 and the mapping is stored in renaming table 20. This physical address is then transmitted to the register bank data storage control circuitry 32 and to encryption circuitry 35.

The write data corresponding to the write request and the write address which is the remapped physical address are input to the encryption circuitry 35 and the write data is encrypted using an encryption key that is generated from this physical address. This encryption key may be generated directly from the physical address or at least a portion of the physical address or it may be generated from a number of things such as the physical and architectural or virtual address or the physical address and the data itself. The encryption is generally a fairly simple encryption process such that it does not delay the storage of the data within the register bank.

The storage control circuitry 32 then acts to write the encrypted data to the register identified by the physical address.

If a read request is received then a virtual address of the architectural register to be read is received at renaming table 20 and the corresponding physical address of the register within register bank 30 is determined from a mapping stored within this renaming table. This address is then transmitted to the read control circuitry 42 and to decryption circuitry 45. The read control circuitry 42 selects the register indicated by the address and outputs the data stored in the selected register to decryption circuitry 45. Decryption circuitry 45 receives this data and generates a decryption key from the read address input from renaming table 20. The read data is then output from data storage circuitry 10.

As described above, an encryption and decryption key is generated from data that is stored in renaming table. This data is different for each register and needs to be stored in order to enable data to be accessed within register bank 30. Thus, it is an ideal source for an encryption key.

As the renaming circuitry 18 selects physical registers in response to a random event the selection is random and thus, the encryption key also changes randomly for each encryption. This introduces noise into the system and makes it difficult for somebody trying to hack into to the system to derive useful information. Thus, although the encryption system may be simple in order not to delay the storage of data, owing to the random nature of the register selection the increase in security is substantial.

It should be noted that although in this case a random event is used to select an available register, in some embodiments it may be done in a deterministic way using an algorithm. This may also provide an acceptable level of security as the location of the physical register will vary depending on the algorithm and the registers available and thus, noise will be added into the system.

It may also be done in response to a pseudo-random event. Such an event is an event that is not completely random as indeed completely random events are difficult to generate, however, it is an event that is fairly random in nature and as such is very difficult to predict.

When selecting a register to store data in, renaming circuitry may select from those registers not currently mapped or it may select any register present. If it does the latter then data needs to be moved from the currently mapped register to a different register and a new mapping needs to be stored. This is explained in more detail with respect to FIG. 3.

Figure 2:
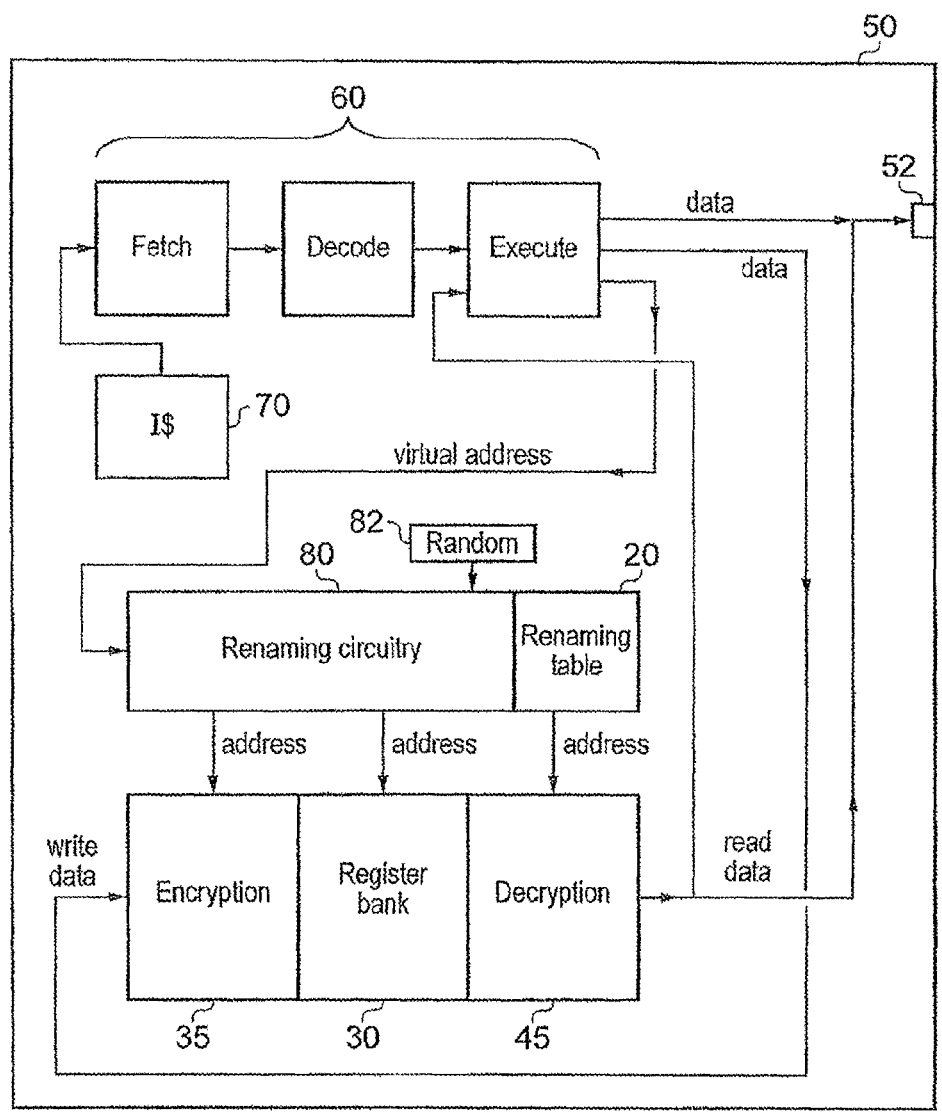
FIG. 2 shows a data processing apparatus according to an embodiment of the present invention.

FIG. 2 shows a data processing apparatus 50 according to an embodiment of the present invention. Data processing apparatus 50 has a processor 60 comprising a fetch stage, a decode stage and an execution stage. Fetch stage fetches instructions from instruction cache 70 and decode stage decodes these instructions. Execution stage will then execute the decoded instruction. The execution stage may also receive data from register bank 30. Execution stage may also output data to register bank 30 or may output data to an external output port 52.

Data processing apparatus 50 includes renaming circuitry 80 with random signal generator 82 and renaming table 20. Renaming circuitry receives virtual or architectural addresses from the execution stage of processor 60. These are addresses specified in instructions that are being processed by processor 60. Renaming circuitry 80 then maps these virtual addresses to physical addresses of registers within register bank 30. It stores the current mappings within renaming table 20. The addresses from these mappings are then output to register bank 30 and to encryption and decryption circuitry 35 and 45. If the data access request is a store request then the data to be stored is output from the execution stage and is input to encryption circuitry 35. Renaming circuitry will output the physical address from the mapping and the encryption circuitry will generate an encryption key using this address and will encrypt the data that it receives. This encrypted data will then be stored in the register bank 30 at the address specified by the address output from renaming circuitry 80.

If the data access request being executed is a read request then the address for this is input to renaming circuitry 80 and the physical address corresponding to this virtual address is found using renaming table 20. This address is then output to decryption circuitry 45 and to the register bank 30. Register bank 30 then outputs the data stored in that address while decryption circuitry 45 generates a decryption key from the physical address. The data output from the register bank is then decrypted using the decryption key and output.

This data may be output back into the execution stage of processor 60 or it may be output via output port 52.

FIG. 3 shows very schematically a renaming table 20 according to an embodiment of the present invention. This renaming table will store a list of current mappings and may store a list of registers not currently mapped, or it may determine this from the list of current mappings. When selecting a register to map a virtual address to in response to a store request, renaming circuitry may select from registers not currently mapped or it may select from all registers. If it selects from a register that is part of a current mapping then the following example shows what occurs.

If a store request to store data in register R5 is received and the physical register selected in response to the random generator 81 is P1 then another mapping would need to be performed to map R0 to a further physical register.

Thus, a further register would be selected in response to the random generator and provided this is to a register not currently mapped, then the data currently stored in P1 is decrypted using a key generated from the P1 address and this data is then encrypted using a key generated from the address of the selected further register and the encrypted data is then written to this register and the mapping is stored. For example, if new register selected was P6 then the data stored in P1 (following decryption and re-encryption) would be written to P6 and the mapping P6 R0 stored. The newly received data would then be written to P1 and the mapping P1 R5 would be stored.

In some embodiments, the renaming circuitry may also be configured to periodically swap some mappings about. Thus, in response to a remapping signal it will randomly select one of the current mappings and will remap it to a different physical register and will store the data in that different physical register. For example it may select current mapping P4 R3 and physical register P15, it will then write the value stored in P4 into P15 (having decrypted and then re-encrypted the data using keys generated from the physical addresses) and it will then delete the P4 R3 mapping from the table and store the P15 R3 mapping. In this way, noise is added to the system making the system more difficult to analyse.

In addition to such periodic remappings, the renaming circuitry may also be configured in response to a request to update a value stored, to perform a remapping such that the value stored in the physical register is not overwritten, rather a new physical register is selected and that mapping stored and the value is written to that register. For example, the following two instructions illustrate this.

LDR R0, addr
ADDS r0, r0, #0

The first instruction writes the contents of the adder into architectural register r0, which due to renaming is P3 and encrypts the data with the address of P3. The second instruction wants to update r0, however, we now remap r0 to another register say P6 and then encrypt this data with the address of P6. In this case the data contained in P6 is different to that contained in P3 due to different encryption keys. The mapping of r0 to P3 can then be deleted.

As noted earlier although the encryption keys and decryption keys can be generated from the physical address itself, they may also be generated from a combination of the data and the physical address, or the data and the virtual address or from just a portion of each of these.

Figure 4:
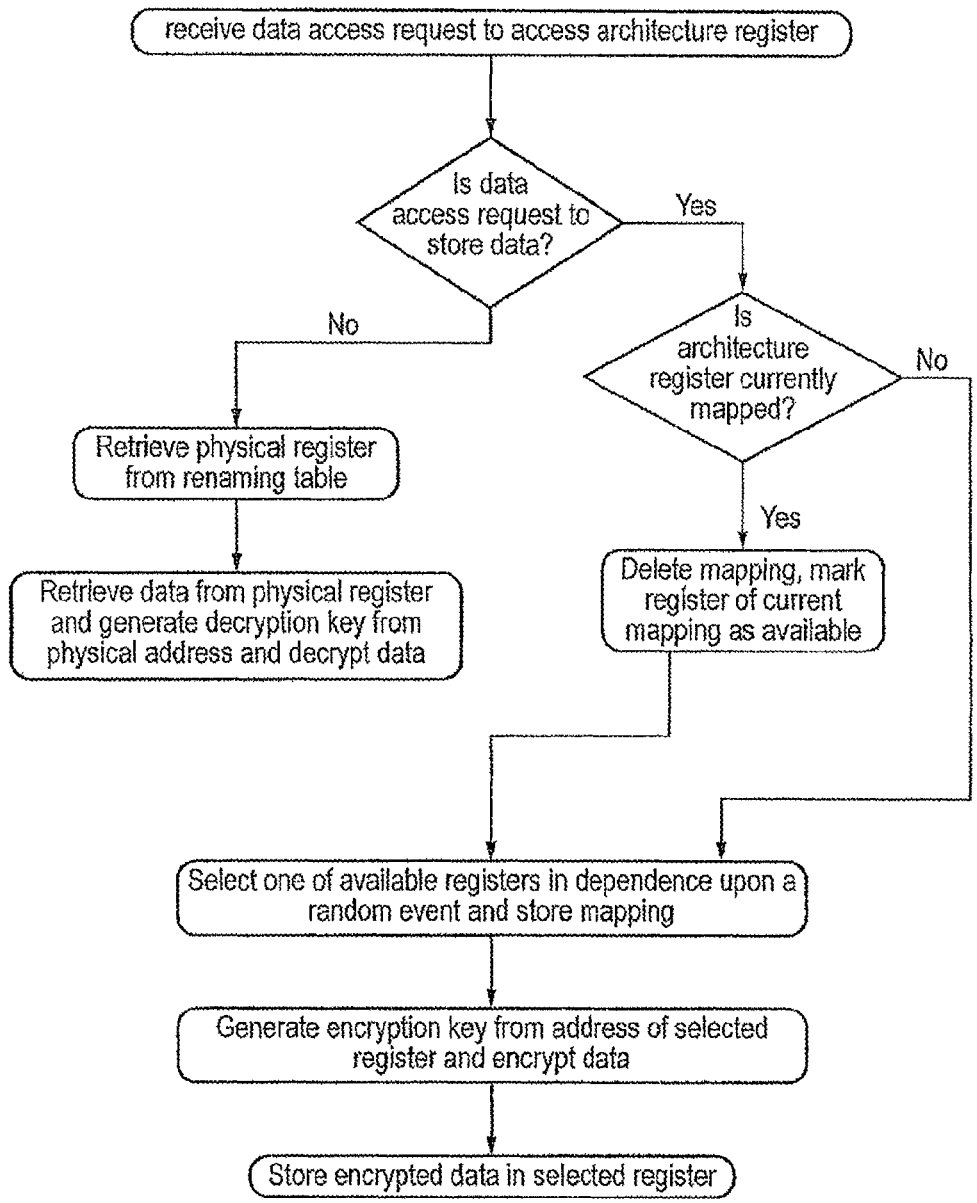
FIG. 4 shows a flow diagram illustrating steps in a method according to an embodiment of the present invention.

FIG. 4 shows a flow diagram illustrating steps in a method according to an embodiment of the present invention. In this method a data access request to access an architectural register is received. This data access may be a load or a store access request. If it is a request to store data then it is determined if the architectural register is currently mapped. If it is not then one of the available registers is selected in dependence upon a random event and the mapping is stored. In this embodiment an available register is one that is not currently mapped. As noted previously, it may be that all registers can be selected and in which case further steps in the method would need to be performed if a register that was part of a current mapping was selected. However, in this embodiment a free register is selected and the mapping is stored. If the architectural register was currently mapped then the mapping is deleted and the physical register of the deleted mapping is marked as being available.

The next step involves the generation of an encryption key from the address of the selected register and the data is then encrypted using this encryption key. The encrypted data is then stored in the selected register.

If the data access was not a store access but was rather a read access then the physical register that was currently storing the data is retrieved from the mapping stored in the renaming table. The data is then retrieved from the physical register and that decryption key is generated from the physical address. The data retrieved from the physical register is then decrypted using this decryption key.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Data storage circuitry comprising:
   a data store comprising a plurality of data storage locations for storing data;
   an input configured to receive requests to access said data store;
   renaming circuitry configured to map architectural data storage locations specified in said access requests to physical data storage locations within said data store;
   encryption circuitry configured to encrypt data prior to storing said data in said data store, said encryption circuitry being configured to generate an encryption key in dependence upon a physical data storage location said data is to be stored in; and
   decryption circuitry configured to decrypt data read from said data store, said decryption circuitry being configured to generate a decryption key in dependence upon said physical data storage location said data is read from,
   wherein said renaming circuitry is configured to determine which of said plurality of physical data storage locations are available to store data specified in an access request and to perform said mapping by selecting one of said available physical data storage locations to map said architectural data storage location to according to a random or pseudo random process and to store mappings for physical data storage locations currently storing valid data; and
   wherein said available physical data storage locations comprise all of the physical data storage locations within said data store,
   wherein said renaming circuitry is configured, when said renaming circuitry selects a physical data storage location from among said available physical data storage locations which is currently mapped, to select another one of said available physical data storage locations according to said random or pseudo random process, to write data stored in said currently mapped physical data storage location to another physical data storage location, to store a mapping for said another physical data storage location, and to store said data specified in said access request to said selected physical data storage location.

2. Data storage circuitry according to claim 1, wherein said data store comprises a register bank and said plurality of data storage locations comprise a plurality of registers.

3. Data storage circuitry according to claim 1, wherein said physical data storage locations are identified by corresponding physical addresses, said encryption and decryption keys being generated from said physical addresses.

4. Data storage circuitry according to claim 1, said renaming circuitry further comprising an input for receiving a random or pseudo randomly generated signal, said renaming circuitry being configured to select said one of said available physical data storage locations in dependence upon said random or pseudo randomly generated signal.

5. Data storage circuitry according to claim 1, said data storage circuitry further comprising a random or pseudo random event generator, said data storage circuitry being configured to select said one of said available physical data storage locations in dependence upon an event generated by said random or pseudo random event generator.

6. Data storage circuitry according to claim 1, wherein said renaming circuitry is configured to automatically perform remappings of currently mapped physical data storage locations.

7. Data storage circuitry according to claim 1, said renaming circuitry being responsive to a request to update a value currently stored in said data store to:
mark said physical data storage location currently storing said value to be updated as not storing valid data and deleting a mapping for said physical data storage location;
map said architectural data storage location specified by said request to an available physical data storage location and to store said mapping.

8. A data processing apparatus comprising:
data storage circuitry according to claim 1, said data store comprising a physical set of registers identified by a corresponding set of physical addresses;
a processor for processing data in response to instructions from an instruction set, said instructions specifying an architectural set of registers;
said renaming circuitry mapping registers from said architectural set to registers within said physical set.

9. A method of storing data within a data store comprising a plurality of data storage locations comprising the steps of:
receiving a request to access said data store;
if said request is a request to store data:
determining which of said plurality of physical data storage locations are available to store data in and mapping an architectural data storage location specified in said access request to a physical data storage locations within said data store by selecting, according to a random or pseudo random process, one of said available physical data storage locations to map said architectural data storage location, wherein said available physical data storage locations comprise all of the physical data storage locations within said data store;
wherein in response to selecting a physical data storage location from among said available physical data storage locations currently storing valid data, selecting another one of said physical data storage locations according to said random or pseudo random process, writing said valid data to said another physical storage location and storing a mapping for said another physical storage location;
encrypting said data prior to storing said data in said physical data storage location from said mapping using an encryption key generated in dependence upon said physical data storage location; or
if said request is to read data:
determining a physical data storage location corresponding to an architectural data storage location specified in said access request from a store of mappings;
decrypting data read from said physical data storage location from said mapping using a decryption key generated in dependence upon said physical data storage location.

10. A method according to claim 9, wherein in response to a request to update a value currently stored in said data store said method performs the following steps:
marking said physical data storage location currently storing said value to be updated as not storing valid data and deleting said mapping for said physical data storage location;
mapping said architectural data storage location specified by said request to an available physical data storage location;
storing said mapping.

11. Data storage circuitry comprising:
means for storing data comprising a plurality of data storage locations;
an input means for receiving requests to access said data store;
renaming means for mapping architectural data storage locations specified in said access requests to physical data storage locations within said data store;
encryption means for encrypting data prior to storing said data in said data store, and for generating an encryption key in dependence upon a physical data storage location said data is to be stored in; and
decryption means for decrypting data read from said data store and for generating a decryption key in dependence upon said physical data storage location said data is read from;
wherein said renaming means is configured to determine which of said plurality of physical data storage locations are available to store data specified in an access request and to perform said mapping by selecting one of said available physical data storage locations to map said architectural data storage location to according to a random or pseudo random process and to store mappings for physical data storage locations currently storing valid data; and
wherein said available physical data storage locations comprise all of the physical data storage locations within said means for storing data,
wherein said renaming means is configured, when said renaming means selects a physical data storage location from among said available physical data storage locations which is currently mapped, to select another one of said available physical data storage locations according to said random or pseudo random process, to write data stored in said currently mapped physical data storage location to said another physical data storage location, to store a mapping for said another physical data storage location, and to store data specified in said access request to said selected physical data storage location.

* * * * *